May 13, 1947.                J. W. RYZNAR                 2,420,340
                   CLARIFICATION OF AQUEOUS LIQUIDS
                       Filed Oct. 26, 1944            2 Sheets—Sheet 1
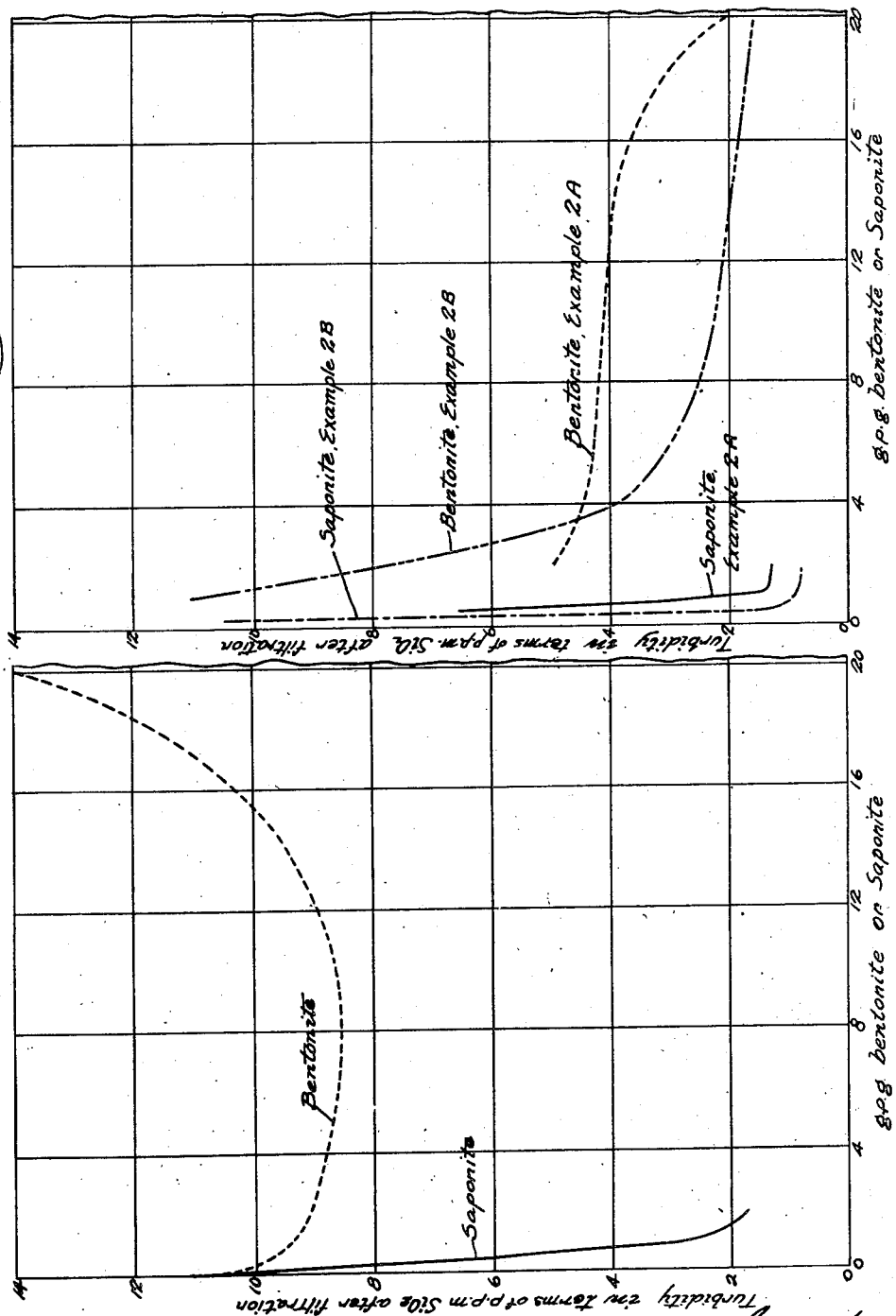

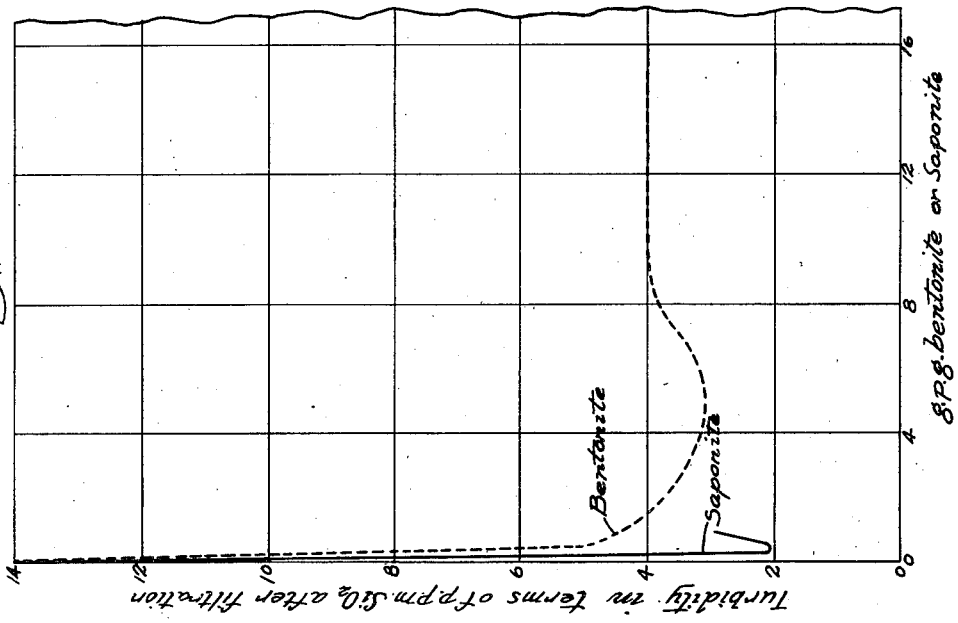
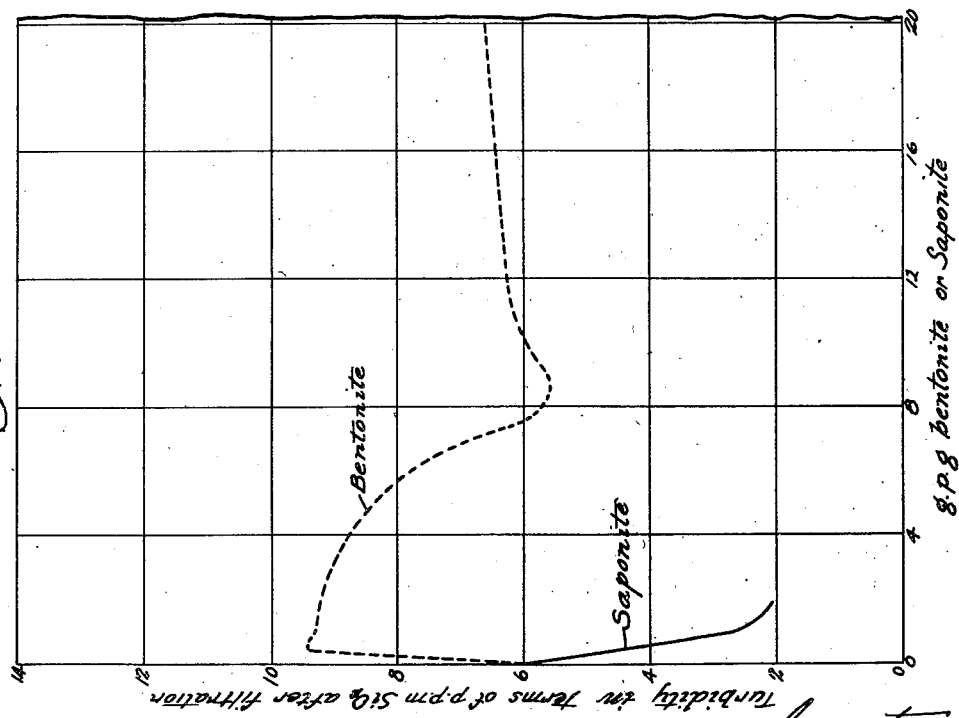

Patented May 13, 1947

2,420,340

UNITED STATES PATENT OFFICE 2,420,340

CLARIFICATION OF AQUEOUS LIQUIDS

John W. Ryznar, La Grange, Ill., assignor to National Aluminate Corporation, Chicago, Ill., a corporation of Delaware Application October 26, 1944, Serial No. 560,446

10 Claims. (Cl. 210—23)

The present invention relates to the clarification of aqueous liquids, as by the coagulation of solids suspended therein, irrespective as to whether the suspended solids are naturally present, as in river waters. or are derived from the chemical treatment of water, as, for example, in various water-softening processes; or present in wastes such as sewage, effluents from creameries and dairies; from foundry sand washing processes, coal washing processes, turbid mine waters, steep-waters, industrial wastes, and, in general, wherever it is desired to remove suspended solids from an aqueous liquid so as to yield a clarified effluent.

The invention is predicated upon the discovery that the mineral known as saponite, which is a hydrous silicate of magnesium with a small amount of aluminum, has unexpectedly valuable properties which enable its utilization as an adjunct to the softening and clarifying chemicals usually employed for the treatment of water and other aqueous fluids. This mineral, saponite, particularly when finely comminuted, when added to water will very greatly increase the rate of settling of flocs produced in said water by the usual types of clarifying and/or water-softening agents. It does this by further flocculating the floc already produced by other coagulants, thus producing a larger and quicker settling floc. Thus the saponite is useful in connection with the softening of water by the so-called lime-soda process, enabling the production of a more quickly settling floc, a clearer water flowing to the filters, and a clearer filtered water; while it is also useful in clarification processes such as use either alum or aluminum sulfate, sodium aluminate, ferric and ferrous salts, and sodium zincate alone; or which use combinations of alum or aluminum sulfate, etc. with sodium aluminate.

One of the objects of the present invention therefore is to improve processes for the softening of water by the lime-soda process which involves the step of adding to the water, precedent to, together with, or following the softening step and the usual coagulant, small but effective amounts of saponite.

A further object of the invention is to clarify water, that is to say, to remove its turbidity therefrom, by adding to said water small but effective amounts of sodium aluminate or any form of trivalent salt, for instance, a sulfate such as aluminum sulfate, alum, or iron sulfate, with preliminary, simultaneous or subsequent addition of small but effective amounts of the saponite.

A further object of the invention is to improve the process of clarifying water, that is to say, to remove its turbidity and to improve its color, which comprises adding thereto small but effective amounts of a trivalent sulfate such as aluminum sulfate, alum or iron sulfate with the precedent, simultaneous or subsequent addition of saponite. Ferrous sulfate may also be used as a coagulant, if desired.

For a better understanding of the present invention, the same is in part illustrated by four figures on the herewith filed drawing, which figures represent comparative graphs comparing the effectiveness of the saponite as compared with a hitherto proposed hydrous clay, to-wit, bentonite. These figures will be described in further detail in connection with the various examples given herein below.

It has already been proposed, as for example in prior patent to Frederick K. Lindsay and John W. Ryznar (the present applicant), United States Patent No. 2,284,827, to improve the treatment of water by the addition thereto of small but effective amounts of a hydrous clay known as bentonite.

It has now been found, however, in accordance with this invention that the mineral saponite is from ten to twenty times as effective as bentonite. It could not have been foreseen that saponite would be so very much more effective than would bentonite. The results obtained therefore are quite unexpected and cannot be readily explained by any particular theory; they are, however, an empirical fact.

Preferably, and to obtain faster action, the saponite, which is a waxy, greasy appearing mineral, is finely pulverized by suitable grinding machinery to reduce it to a powder of about 200 mesh or finer. A coarser material can be used, but is slower in dispersing and hence slower acting. The mineral is quite insoluble in water, but appears to have the property of going into a state of colloidal suspension of apparently water swollen particles. These particles, which are distributed throughout the water that is undergoing treatment, appear to be endowed with the special properties of agglomerating formed, to be formed, or already existing gelatinous precipitates and other suspended matter so as to increase the size of the flocs which form, with the result that the subsidence of these flocs under the influence of gravity is considerably speeded up.

Saponite rarely occurs pure in commercial quantities, but a deposit at Hector, Calif., has proved admirably suited for the present purposes. It consists of about 50% to 60% of saponite, the rest being mainly calcium carbonate. The quantities required for treating liquids mentioned hereinbelow refer to the impure material, and refer to the U. S. gallon (231 cu. in.). The calcium carbonate present is inert as regards coagulation and does not aid in the action of the saponite.

As already briefly indicated, the saponite may be added to the water either before, during, or after the addition of the other treating chemicals; or it may be used alone.

Moreover the saponite may be added dry, or, if desired, as a suspension in water.

The advantages of the invention will be further illustrated by reference to the following examples and the accompanying drawings wherein Figs. 1, 2, 3 and 4 are comparative graphs showing turbidity in terms of parts per million $SiO_2$ after filtration plotted against grains per gallon of bentonite and saponite.

Example 1

This example relates to a process for the clarification of water by the use merely of aluminum sulfate, that is, the ordinary water-treating alum of commerce. The example is moreover illustrated by Fig. 1 of the already mentioned drawing, this figure being in the form of a graph showing the turbidity, after filtration, of water which had been treated on the one hand in accordance with the present invention, and on the other hand with similar quantities of bentonite. The purpose of the graph is to show the much higher efficacy of the saponite as contrasted with bentonite. The tests which form the basis for the present example were carried out with ordinary Chicago tap water, that is, water drawn from Lake Michigan, into which water there had been added 5 grams of kaolin per gallon in order to render the water turbid. This water, after the addition of the kaolin, had a turbidity in terms of suspended $SiO_2$, such as is measured on the Hellige turbidimeter, of 2900 P. P. M. of $SiO_2$. This water, without any treatment and by merely filtration, could be reduced to 18.4 P. P. M. of $SiO_2$. For purposes of the tests a given quantity of this water was treated with aluminum sulfate to the extent of ½ g. p. g. (grain per gallon) also receiving various additions, first of bentonite, and then, in a separate test, of saponite which had been ground to a 200 mesh powder. The water was then stirred, allowed to settle for a short time, and then filtered, and the filtrate tested for turbidity on the Hellige turbidimeter.

In Fig. 1 the vertical component is given in parts per million of $SiO_2$, after filtration, while the horizontal component is grains per gallon of bentonite or saponite, respectively.

The curve for the bentonite is in the form of a broken line and that of the saponite as a solid line.

It will be noticed from this figure that when using ¼ g. p. g. of bentonite the turbidity was reduced only to about 9.6 P. P. M. of $SiO_2$; with 1 g. p. g. of bentonite to about 9.4 P. P. M. $SiO_2$; with 2 g. p. g. of bentonite to about 9 P. P. M. $SiO_2$; with 4 g. p. g. of bentonite to about 8.8 P. P. M. $SiO_2$; with 8 g. p. g. of bentonite to about 8.5 P. P. M. of $SiO_2$; while with 20 g. p. g. of bentonite the turbidity actually was increased to 14. In other words, the best results were obtained with 8 g. p. g of bentonite, while the addition of further quantities increased rather than decreased the turbidity.

In contrast thereto note the effects of the saponite. ½ g. p. g. of saponite decreased the turbidity to 6 P. P. M. of $SiO_2$. 1 g. p. g of saponite brought the turbidity down to slightly over 2, and 2 g. p. g. of saponite brought it down to about 1.8.

The tremendous superiority of the saponite is thus made apparent in connection with the treatment of water merely by means of alum and saponite.

Example 2

Four curves are shown in Fig. 2 which illustrate this example, the example being divided into two parts designated respectively as 2A and 2B. In Example 2A the treatment of the water, which was Chicago tap water containing 5 grams of added kaolin per gallon, consisted in addition to the water of 1 g. p. g. of a commercial form of sodium aluminate, $Na_2Al_2O_4$. In Example 2A 2 g. p. g. of this sodium aluminate were used. In both cases bentonite was contrasted with saponite. In order to distinguish the curves, the saponite results in 2A are shown as a solid line and in Example 2B as a dash and dot line, while the bentonite in Example 2A is shown as a dotted line as Example 2B as a triple dot and dash line.

In comparing first the results of Example 2A, it will be noticed that 2 g. p. g. of bentonite reduced the turbidity of the water to about 5 P. P. M. $SiO_2$; 4 g. p. g., to about 4.1; 12 g. p. g. to about 4; 16 g. p. g. to about 3.9; and 20 g. p. g. to just about 2.

On the other hand the saponite when added to the extent of ½ g. p. g reduced the turbidity to about 6.3, but by raising the amount of saponite to 1 p. p. g. the turbidity dropped to about 3, while with 1½ g. p. g. of saponite, the turbidity was just about 1. The increase in the amount of saponite to 2 g. p. g. made but little difference in turbidity, in that case also being only about 1 P. P. M. All the turbidity figures throughout these examples are always given in terms of parts per million of $SiO_2$.

It will thus be seen that 1 grain of saponite did a better job than even 20 grains of bentonite.

In Example 2B a similar and very marked advantage in favor of saponite can be seen. Thus 1½ grains of bentonite reduced the turbidity to about 11; 2 grains to about 8.1; 4 grains to about 3.8; 8 grains to about 2.5; 12 grains to about 2.1; and 20 grains to about 1.8. The saponite on the other hand, even when used to the extent of only ¼ of a grain per gallon, reduced the turbidity to slightly over 10, while the addition of 1 g. p. g brought the turbidity down to less than 1 P. P. M; raising the saponite to 2 g. p. g. made no further improvement, the turbidity being below 1 P. P. M.

The entirely unexpected and marked superiority of the saponite will thus be plainly apparent.

Example 3

In Example 3 the water used again was Chicago tap water to each gallon of which there had been added 5 grams of kaolin. In Fig. 3 the basic treatment of the water was ½ g. p. g. of aluminum sulfate (alum) and ¼ g. p. g. of sodium aluminate. Various quantities of bentonite and saponite were added, bentonite being shown by the dotted line and the saponite being shown by the solid line. It will be noted that so far as the saponite is concerned ½ g. p. g. brought the turbidity down to about 4.2; ¾ g. p. g. brought it down to 4; 1 g. p. g. to about 2.2; and 2 g. p. g. to just slightly over 2. The bentonite on the other hand, when added in amounts of 1 g. p. g., brought the turbidity down to only about 9 P. P. M.; 4 g. p. g. brought it down to not much less, while it took 8 g. p. g. to bring it down to about 5½ P. P. M.; and the addition of larger amounts, such as 12 grains, 16 grains and 20 grains, produced a curve which is practically a straight line lying somewhere above 6 P. P. M.

In other words, in this particular example, the saponite was incomparably better than the bentonite.

Example 4

Example 4 is similar to Example 2, except that the basic treatment of the water was ½ g. p. g. of aluminum sulfate (alum) and ½ g. p. g. of sodium aluminate. While the effects here were not quite as striking as in connection with Fig. 3, the saponite was still far superior to the bentonite. It will be noticed that ½ g. p. g. of saponite brought the turbidity down to 2, while the same amount of bentonite brought it down only to about 9.7; 1 g. p. g. of bentonite brought the turbidity down to about 4.3 while the same amount of saponite brought it down to about 3.

Example 5

This example, which is not illustrated in the curves, deals with the softening of water with the use of the well known lime-soda softening plant, the tests being carried out in this case on a large scale, namely, with a 70,000 gallon tank of feed water which is available at Beverly, Iowa. The operations were as follows:

The tank was filled with 50,000 gallons of water to which there were added 100 pounds of lime (hydrate), 55 pounds of soda ash, and 3¾ pounds of sodium aluminate. The mixture was agitated for about 15 minutes in order to get the chemicals into solution and into reaction with each other. Thereafter saponite was added to the extent of ¾ grains for each gallon and the tank again stirred, the stirring being effected by means of air which was pumped into the bottom of the tank, the rising bubbles serving to effect the desired agitation.

After the saponite had been added, the tank was violently agitated for about one minute to distribute the material throughout the tank, whereafter the agitating air was cut off and the material allowed to settle.

Within 15 minutes thereafter a coarse floc had formed which was three-fourths settled. At the end of 25 minutes the top half of the tank was clear and at the end of one hour the sludge had settled completely to the bottom in the form of a coarse heavy sediment while the water above it was perfectly clear.

From previous experience with similar amounts of lime, soda ash and sodium aluminate, it was found that even at the end of an hour and 55 minutes a large portion of the fine floc was still suspended. In other words, the addition of as little as ¾ g. p. g. of the finely powdered saponite served to produce a perfectly clear settled softened water in about an hour's time. This is a very great improvement, as it saves a very large amount of time and also produces a clearer water. Such water, as is well known, is widely used as feed water to locomotives and for stationary boilers. Obviously the introduction of suspended sludge is undesirable, as it still further adds to the suspended solids in the boiler.

Example 6

The effectiveness of saponite when used in connection with the softening of water by the lime-soda ash method in conjunction with certain coagulants is strikingly demonstrated by this example. The water employed in these demonstrations was Lake Michigan water diluted with an equal volume of distilled water, such a mixture being known from other experiments as one that was particularly difficult to clarify after a softening treatment. The water was first softened by treatment with 5.6 grains per gallon of calcium hydroxide and 4.0 grains per gallon of soda ash. Various coagulants were then added, and the water was allowed to stand for a half hour, and then supernatant liquid examined. The results were as follows:

Without any additions after the softening treatment, the coagulation could properly be classified as rather poor, and the supernatant liquid, measured in the manner already indicated, was 90.

With the addition of ½ grains per gallon of alum, the coagulation was fair and the turbidity 53. However, by using 0.2 grain per gallon of saponite and only ¼ grains per gallon of alum, the coagulation was very good and the turbidity had dropped to 24.

In a further test, ¼ g. p. g. of ferrous sulfate was added to the softened water, resulting in what could properly be classified as poor coagulation, with a turbidity in the supernatant water after ½ hour standing as 85. However, by using 0.2 g. p. g. of saponite with the same amount of ferrous sulfate (i. e. ¼ g. p. g.) the coagulation was good, and the turbidity dropped to 27.

A similar set of comparative tests were made with ferric sulfate, the results being as follows: ferric sulfate alone (¼ g. p. g.) gave fair coagulation and a turbidity of 50; but when 0.2 g. p. g. of saponite were used with the same amount of ferric sulfate the coagulation was good and the turbidity 29.

A similar test was made with sodium zincate, but because of the alkalinity of this material (by reason of its sodium hydroxide content) less lime and soda ash were used, namely, 3.1 g. p. g. of lime and 1.0 g. p. g. of soda ash. Using 5.0 g. p. g. of sodium zincate the coagulation was fair and the turbidity was 96; but by using 1.0 g. p. g. of saponite with the 5.0 g. p. g. of sodium zincate, the coagulation was good and the turbidity only 46.

Example 7

In accordance with this example, a foundry sand washing water very high in suspended organic and inorganic matter was clarified. Even the use of saponite alone, in the presence of high electrolytes or those added to the liquid, can effect clarification. Thus, to the foundry sand washing water 1.0 grain of saponite per gallon was added. Calcium hydroxide or lime was added. The coagulation was good. With the use of lime alone, and in the absence of saponite the coagulation was merely fair with a turbidity in the supernatant water of 64 P. P. M. (as $SiO_2$). With the use of 1 g. p. g. of saponite the turbidity dropped to 28.

Example 8

This example concerns the clarification of a waste mine water having a high content of red iron oxide which remains as a very finely divided suspension in the water. Upon the addition of 15 g. p. g. of lime and 1.0 g. p. g. of saponite, good coagulation was obtained, with a turbidity in the supernatant water of 43 (as $SiO_2$).

In addition to the above examples it is again pointed out that under suitable conditions saponite alone may be used. Thus in some cases where the electrolyte concentration in the water is fairly high, saponite alone will form a hydrous floc which effects clarification of the water of any suspended matter.

The mineral, saponite, has also been fully described in Bulletin 848 of the Geological Survey of the United States Department of the Interior, on pages 153, 155 and 158, in an article by Larson & Berman, on the Microscopic determination of the non-opaque minerals.

It is believed that the above eight examples serve adequately to point out the advantages of the use of the saponite. In general, it might be stated that it will scarcely even be necessary to use more than about 5 grains of saponite per gallon of liquid treated, and even as little as 0.1 of a grain per gallon produces effective results in some cases.

The invention is moreover useful for the removal of color from water, particularly if the same is produced by the presence of finely divided colloidal matter and possibly dissolved organic matter which lends itself to coagulation followed by filtration, and for the purposes enumerated at the beginning of this specification.

Accordingly I claim:

1. In a process of clarifying aqueous liquids containing suspended solids, the step which comprises adding thereto a small amount of saponite effective to clarify said liquids.

2. In a process of clarifying aqueous liquids, the step which comprises adding thereto from about 0.1 to about 5 grains per U. S. gallon of saponite.

3. A process of softening and clarifying water which comprises treating said water with hardness-precipitating chemicals, and thereupon adding thereto from about 0.1 to about 5 grains per gallon of saponite.

4. A process of softening and clarifying water which comprises treating said water with hardness-precipitating chemicals and a coagulant, and thereupon adding thereto from about 0.1 to about 5 grains per gallon of saponite.

5. In the process of softening water by the lime-soda ash method, the improvement which comprises clarifying the softened water by the addition thereto of from about 0.1 to about 5.0 grains per gallon of saponite.

6. The process of clarifying water which comprises adding thereto a small amount of a tri-valent metal salt as a precipitant, and enhancing the floc formation and the settling of the resulting floc by the addition to the water of from about 0.1 to about 5.0 grains per gallon of saponite.

7. The process of treating water which comprises adding thereto from about ¼ to about 2 grains per gallon of sodium aluminate and about from 0.1 to about 5.0 grains per gallon of saponite.

8. In a process of treating water, the step which comprises adding thereto an alkali metal aluminate and from about 0.1 to about 5.0 grains per gallon of saponite.

9. In a process of softening water by the lime-soda ash method, the improvement which includes the step of adding small amounts of sodium aluminate and saponite to the water as a coagulant therefor.

10. In the process of clarifying aqueous liquids containing suspended solids, the step which comprises adding thereto a coagulant, and a small amount of saponite effective to clarify said liquids.

JOHN W. RYZNAR.

REFERENCES CITED

The following references are of record in the file of this patent:

UNITED STATES PATENTS

| Number | Name | Date |
| --- | --- | --- |
| 2,284,827 | Lindsay | June 2, 1942 |
| 2,163,527 | Caldwell | June 20, 1939 |
| 2,281,759 | Gelder | May 5, 1942 |
| 2,345,828 | Olin | Apr. 4, 1944 |
| 1,604,125 | Kern | Oct. 26, 1926 |
| 2,345,827 | Olin | Apr. 4, 1944 |
| 2,354,146 | Samuel | July 18, 1944 |
| 2,362,022 | Olin | Nov. 7, 1944 |
| 1,604,124 | Kern | Oct. 26, 1926 |

Certificate of Correction

Patent No. 2,420,340. May 13, 1947.

JOHN W. RYZNAR

It is hereby certified that error appears in the printed specification of the above numbered patent requiring correction as follows: Column 4, line 26, Example 2, for the words "line as" read *line and*; and that the said Letters Patent should be read with this correction therein that the same may conform to the record of the case in the Patent Office.

Signed and sealed this 27th day of January, A. D. 1948.

[SEAL]

THOMAS F. MURPHY,
*Assistant Commissioner of Patents.*